US012006901B2

United States Patent
Tamura et al.

(10) Patent No.: US 12,006,901 B2
(45) Date of Patent: Jun. 11, 2024

(54) FUEL PUMP

(71) Applicant: Hitachi Astemo, Ltd., Hitachinaka (JP)

(72) Inventors: Shingo Tamura, Hitachinaka (JP);
Satoshi Usui, Hitachinaka (JP);
Kazuaki Tokumaru, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/927,179

(22) PCT Filed: May 19, 2021

(86) PCT No.: PCT/JP2021/019018
§ 371 (c)(1),
(2) Date: Nov. 22, 2022

(87) PCT Pub. No.: WO2022/014150
PCT Pub. Date: Jan. 20, 2022

(65) Prior Publication Data
US 2023/0193865 A1 Jun. 22, 2023

(30) Foreign Application Priority Data

Jul. 17, 2020 (JP) .................................. 2020-122681

(51) Int. Cl.
*F02M 59/04* (2006.01)
*F02M 21/02* (2006.01)
(Continued)

(52) U.S. Cl.
CPC ........ *F02M 59/04* (2013.01); *F02M 21/0245* (2013.01); *F02M 59/44* (2013.01);
(Continued)

(58) Field of Classification Search
CPC .... F02M 59/04; F02M 21/0245; F02M 59/44; F02M 59/48; F02M 59/485;
(Continued)

(56) References Cited

U.S. PATENT DOCUMENTS 4,430,977 A * 2/1984 Shimada ................ F02M 55/00
123/449
4,447,194 A * 5/1984 Worby ................. F02M 59/485
417/490

(Continued)

FOREIGN PATENT DOCUMENTS

DE   10 2004 063 074 A1   7/2006
DE   10 2014 010 718 A1   1/2016
(Continued)

OTHER PUBLICATIONS

International Search Report (PCT/ISA/210) issued in PCT Application No. PCT/JP2021/019018 dated Jul. 20, 2021 with English translation (seven (7) pages).
(Continued)

*Primary Examiner* — Sizo B Vilakazi
*Assistant Examiner* — Brian R Kirby
(74) *Attorney, Agent, or Firm* — Crowell & Moring LLP

(57) ABSTRACT

The present invention provides a fuel pump capable of suppressing sticking of a plunger. The fuel pump of the present invention includes a plunger 2 that reciprocates, a cylinder 6 in which a guide hole 6a that guides the reciprocating motion of the plunger 2 extends in the axial direction, and a pump body 1 that holds the cylinder 6. The pump body 1 includes a cylinder insertion hole 1g into which the cylinder 6 is inserted, and a pressurizing chamber 11 that communicates with the cylinder insertion hole 1g and has a volume increased or decreased by the reciprocating motion of the plunger 2. The cylinder 6 includes a press-fitting portion 6b press-fitted into the inner peripheral surface of the cylinder insertion hole 1g, and a groove 6d formed at a position corresponding to the press-fitting portion 6b on the inner peripheral surface of the guide hole 6a.

7 Claims, 8 Drawing Sheets

(51) Int. Cl.
    *F02M 59/44*     (2006.01)
    *F02M 59/48*     (2006.01)

(52) U.S. Cl.
    CPC .......... *F02M 59/48* (2013.01); *F02M 59/485* (2013.01); *F02M 2200/8053* (2013.01); *F02M 2200/8061* (2013.01)

(58) Field of Classification Search
    CPC ... F02M 2200/8053; F02M 2200/8061; F02M 2200/852; F02M 59/442; Y02T 10/12
    See application file for complete search history.

(56) References Cited

U.S. PATENT DOCUMENTS

| | | | | |
|---|---|---|---|---|
| 4,480,623 A * | 11/1984 | Thomas | ............... | F02M 59/442 |
| | | | | 123/41.31 |
| 4,526,149 A * | 7/1985 | Haefele | ................ | F02M 59/366 |
| | | | | 417/494 |
| 4,887,955 A * | 12/1989 | Maruyama | ............. | F02M 57/02 |
| | | | | 417/570 |
| 5,071,324 A * | 12/1991 | Ishimoto | ................ | F02M 59/48 |
| | | | | 123/495 |
| 5,567,134 A * | 10/1996 | Inoue | ..................... | F02M 39/02 |
| | | | | 417/490 |
| 5,603,303 A * | 2/1997 | Okajima | .............. | F02M 59/366 |
| | | | | 123/508 |
| 5,899,136 A * | 5/1999 | Tarr | ..................... | F02M 59/442 |
| | | | | 123/495 |
| 5,921,760 A * | 7/1999 | Isozumi | .................. | F04B 53/16 |
| | | | | 417/470 |
| 7,744,353 B2 * | 6/2010 | Yamada | ............... | F02M 59/462 |
| | | | | 417/470 |
| 8,382,458 B2 * | 2/2013 | Hashida | ............... | F02M 59/102 |
| | | | | 417/415 |
| 8,672,652 B2 * | 3/2014 | Munakata | .............. | B23K 11/16 |
| | | | | 417/437 |
| 9,115,713 B2 * | 8/2015 | Oikawa | ................. | F02M 59/44 |
| 9,410,519 B2 * | 8/2016 | Usui | ..................... | F04B 1/0408 |
| 10,330,066 B2 * | 6/2019 | Kulzer | ................. | F02M 59/485 |
| 10,890,151 B2 * | 1/2021 | Tokumaru | ............ | F02M 59/442 |
| 2004/0052664 A1 * | 3/2004 | Saito | .................... | F02M 59/442 |
| | | | | 417/490 |
| 2006/0222538 A1 * | 10/2006 | Inoue | .................... | F02M 59/447 |
| | | | | 417/470 |
| 2006/0228239 A1 * | 10/2006 | Usui | ..................... | F02M 59/102 |
| | | | | 417/470 |
| 2009/0288639 A1 * | 11/2009 | Usui | ..................... | F02M 55/04 |
| | | | | 123/457 |
| 2011/0247488 A1 * | 10/2011 | Oikawa | ................. | F02M 59/44 |
| | | | | 92/144 |
| 2012/0195780 A1 * | 8/2012 | Matsumoto | .......... | F02M 59/102 |
| | | | | 417/559 |
| 2012/0251363 A1 * | 10/2012 | Kuroyanagi | .............. | F04B 7/04 |
| | | | | 417/437 |
| 2012/0288389 A1 * | 11/2012 | Kuroyanagi | .............. | F16K 1/54 |
| | | | | 417/559 |
| 2016/0090956 A1 | 3/2016 | Tsuboi | | |
| 2018/0087502 A1 * | 3/2018 | Ohgane | ............. | F02M 63/0077 |
| 2020/0049116 A1 | 2/2020 | Tokumaru et al. | | |

FOREIGN PATENT DOCUMENTS

| | | | | |
|---|---|---|---|---|
| GB | 2123492 A * | 2/1984 | .......... | F02M 59/442 |
| JP | 10-318091 A | 12/1998 | | |
| JP | 2007-231959 A | 9/2007 | | |
| JP | 2009-185613 A | 8/2009 | | |
| JP | 2016-70087 A | 5/2016 | | |
| JP | 2018-105274 A | 7/2018 | | |
| WO | WO-2016012076 A1 * | 1/2016 | .......... | F02M 59/102 |
| WO | WO 2018/186219 A1 | 10/2018 | | |
| WO | WO-2018186219 A1 * | 10/2018 | ............ | F02M 59/36 |

OTHER PUBLICATIONS

Japanese-language Written Opinion (PCT/ISA/237) issued in PCT Application No. PCT/JP2021/019018 dated Jul. 20, 2021 (four (4) pages).

\* cited by examiner

FUEL PUMP

TECHNICAL FIELD

The present invention relates to a fuel pump for an internal combustion engine of a vehicle.

BACKGROUND ART

In a direct injection type engine that directly injects fuel into a combustion chamber of an engine (internal combustion engine) of an automobile or the like, a high-pressure fuel pump for increasing the fuel pressure is widely used. As a conventional technique of the high-pressure fuel pump, for example, PTL 1 discloses a high-pressure fuel pump.

The high-pressure fuel pump described in PTL 1 includes the pump body where the pressurizing chamber is formed and the cylinder where the hole formed in the pump body is inserted. In the cylinder, the convex portion on the radially outer side on the side opposite to the pressurizing chamber is press-fitted into the hole portion, and is screwed to the hole portion with a screw thread. Alternatively, the cylinder is swaged and joined to the hole portion by swaging the side opposite to the pressurizing chamber. Then, the cylinder is formed with a clearance in the radial direction with respect to the hole of the pump body over the entire region from a bonding portion to the upper end.

CITATION LIST

Patent Literature

PTL 1: WO 2018/186219

SUMMARY OF INVENTION

Technical Problem

However, in the high-pressure fuel pump described in PTL 1, the temperature of the fuel in the pressurizing chamber rises by pressurizing the fuel, and the heat is transferred to the vicinity of the press-fitting portion of the cylinder in the pump body. Then, the vicinity of the press-fitting portion of the cylinder in the pump body is deformed by heat, so that the cylinder is deformed inward. As a result, the plunger is compressed and fixed.

An object of the present invention is to provide a fuel pump capable of suppressing sticking of a plunger in consideration of the above problems.

Solution to Problem

In order to solve the above problems and achieve the object of the present invention, the fuel pump of the present invention includes a plunger that reciprocates, a cylinder in which a guide hole that guides the reciprocating motion of the plunger extends in the axial direction, and a pump body that holds the cylinder. The pump body includes a cylinder insertion hole into which the cylinder is inserted, and a pressurizing chamber that communicates with the cylinder insertion hole and has a volume increased or decreased by the reciprocating motion of the plunger. The cylinder includes a press-fitting portion press-fitted into the inner peripheral surface of the cylinder insertion hole, and a groove formed at a position corresponding to the press-fitting portion on the inner peripheral surface of the guide hole.

Advantageous Effects of Invention

According to the fuel pump having the above configuration, the fixing of the plunger can be suppressed.

Objects, configurations, and effects besides the above description will be apparent through the explanation on the following embodiments.

DESCRIPTION OF EMBODIMENTS

1. Embodiment of High-Pressure Fuel Pump

Figure 1:
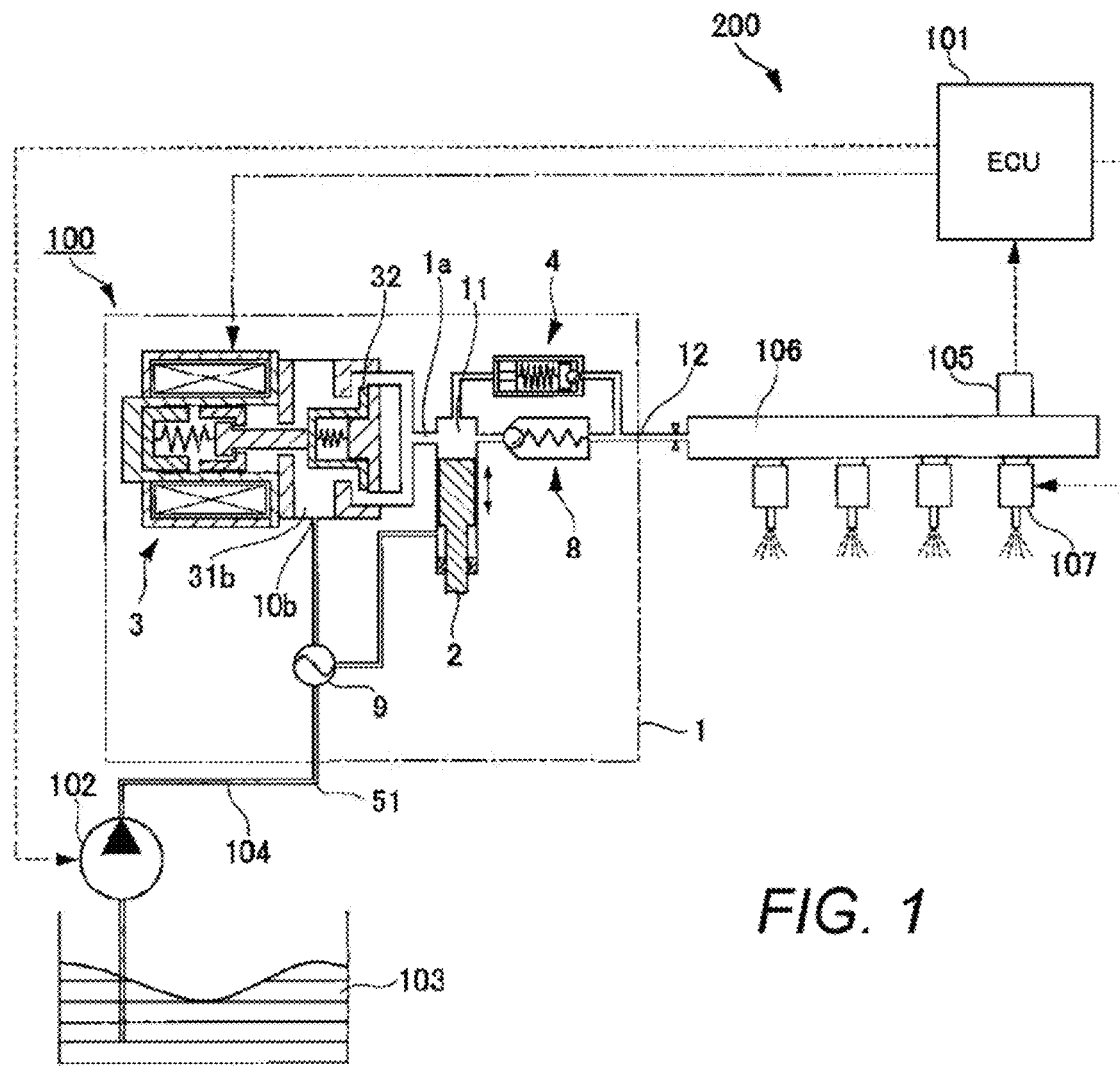
FIG. 1 is an overall configuration diagram of a fuel supply system using a high-pressure fuel pump according to an embodiment of the present invention.

Hereinafter, a high-pressure fuel pump according to an embodiment of the present invention will be described. The common members in each drawing are designated by the same reference numerals.

[Fuel Supply System]

First, a fuel supply system using a high-pressure fuel pump according to the present embodiment will be described with reference to FIG. 1.

FIG. 1 is an overall configuration diagram of the fuel supply system using the high-pressure fuel pump according to the present embodiment.

As illustrated in FIG. 1, a fuel supply system 200 includes a high-pressure fuel pump 100, an engine control unit (ECU) 101, a fuel tank 103, a common rail 106, and a plurality of injectors 107. The components of the high-pressure fuel pump 100 are integrally incorporated in a pump body 1.

The fuel in the fuel tank 103 is pumped up by a feed pump 102 that is driven based on a signal from the ECU 101. The pumped fuel is pressurized to an appropriate pressure by a pressure regulator (not illustrated) and sent to a low-pressure fuel suction port 51 of the high-pressure fuel pump 100 through a low-pressure pipe 104.

The high-pressure fuel pump 100 pressurizes the fuel supplied from the fuel tank 103 and pressure-feeds the fuel to the common rail 106. A plurality of injectors 107 and a fuel pressure sensor 105 are mounted on the common rail 106. The plurality of injectors 107 is mounted in accordance with the number of cylinders (combustion chambers), and injects fuel according to a drive current output from the ECU 101. The fuel supply system 200 of the present embodiment is a so-called direct injection engine system in which the injector 107 directly injects fuel into a cylinder of the engine.

The fuel pressure sensor 105 outputs the detected pressure data to the ECU 101. The ECU 101 calculates an appropriate injection fuel amount (target injection fuel length), an appropriate fuel pressure (target fuel pressure), and the like based on engine state quantities (for example, a crank rotation angle, a throttle opening, an engine speed, a fuel pressure, and the like) obtained from various sensors.

The ECU 101 controls driving of the high-pressure fuel pump 100 and the plurality of injectors 107 based on a calculation result of the fuel pressure (target fuel pressure) and the like. That is, the ECU 101 includes a pump control unit that controls the high-pressure fuel pump 100 and an injector control unit that controls the injector 107.

The high-pressure fuel pump 100 includes a metal damper 9 which is a pressure pulsation reduction mechanism, an electromagnetic suction valve mechanism 3 which is a capacity variable mechanism, a relief valve mechanism 4, and a discharge valve mechanism 8. The fuel flowing from the low-pressure fuel suction port 51 reaches a suction port 31b of the electromagnetic suction valve mechanism 3 via the metal damper 9 and a suction passage 10b.

The fuel flowing into the electromagnetic suction valve mechanism 3 passes through a suction valve 32, flows through a suction passage 1a formed in the pump body 1, and then flows into a pressurizing chamber 11. The pump body 1 slidably holds a plunger 2. The plunger 2 reciprocates when power is transmitted by a cam 91 (see FIG. 2) of the engine. One end of the plunger 2 is inserted into the pressurizing chamber 11 to increase or decrease the volume of the pressurizing chamber 11.

In the pressurizing chamber 11, fuel is sucked from the electromagnetic suction valve mechanism 3 in the downward stroke of the plunger 2, and the fuel is pressurized in the upward stroke of the plunger 2. When the fuel pressure in the pressurizing chamber 11 exceeds a set value, the discharge valve mechanism 8 is opened, and the high-pressure fuel is pressure-fed to the common rail 106 via a discharge passage 1f. The fuel discharge by the high-pressure fuel pump 100 is operated by opening and closing the electromagnetic suction valve mechanism 3. The opening and closing of the electromagnetic suction valve mechanism 3 is controlled by the ECU 101.

In a case where an abnormal high pressure occurs in the common rail 106 or the like due to a failure of the injector 107 or the like, when a differential pressure between a fuel discharge port 12a (see FIG. 2) communicating with the common rail 106 and the pressurizing chamber 11 becomes equal to or higher than a valve opening pressure (predetermined value) of the relief valve mechanism 4, the relief valve mechanism 4 opens. Therefore, the fuel having the abnormally high pressure is returned to the pressurizing chamber 11 through the relief valve mechanism 4. As a result, pipes such as the common rail 106 are protected.

[High-Pressure Fuel Pump]

Next, a configuration of the high-pressure fuel pump 100 will be described with reference to FIGS. 2 to 4.

Figure 2:
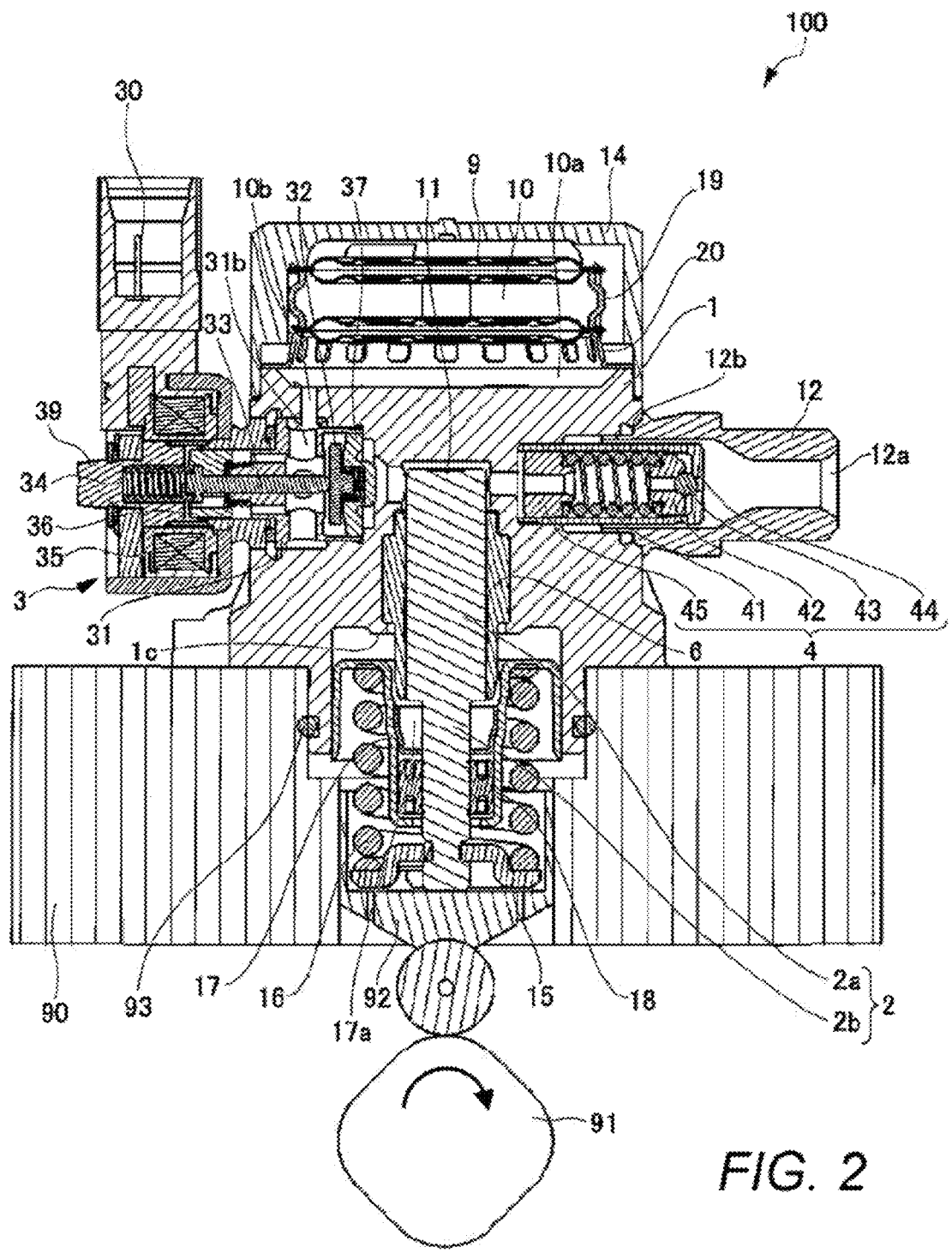
FIG. 2 is a longitudinal cross-sectional view (part 1) of the high-pressure fuel pump according to the embodiment of the present invention.

FIG. 2 is a longitudinal cross-sectional view (part 1) of the high-pressure fuel pump 100 as viewed in a cross section orthogonal to the horizontal direction. FIG. 3 is a horizontal cross-sectional view of the high-pressure fuel pump 100 as viewed in a cross section orthogonal to the vertical direction. FIG. 4 is a longitudinal cross-sectional view (part 2) of the high-pressure fuel pump 100 as viewed in a cross section orthogonal to the horizontal direction.

Figure 3:
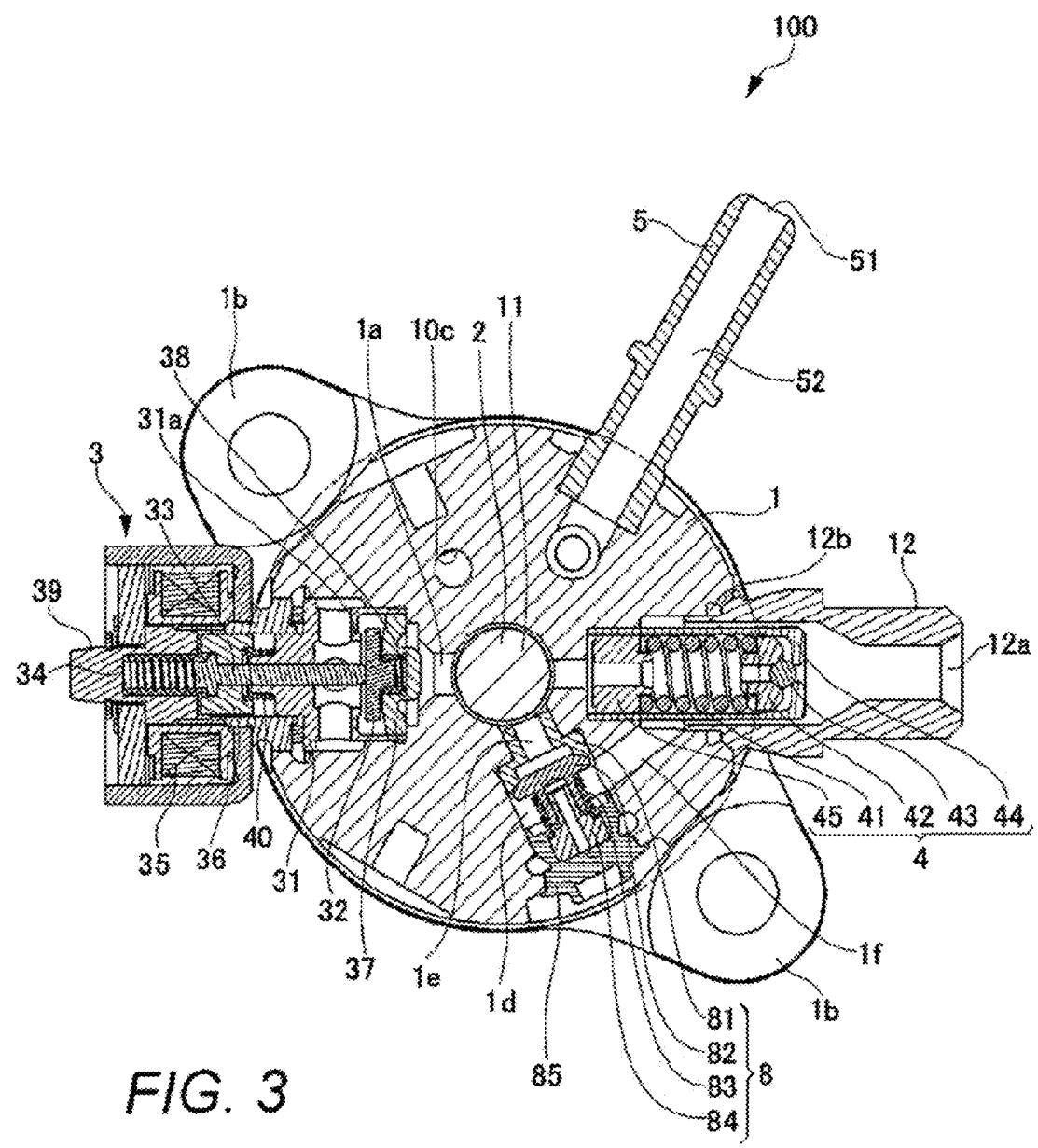
FIG. 3 is a horizontal cross-sectional view of the high-pressure fuel pump according to the embodiment of the present invention as viewed from above.

As illustrated in FIGS. 2 and 3, the pump body 1 of the high-pressure fuel pump 100 is provided with the suction passage 1a and an attachment flange 1b (see FIG. 3) described above. The attachment flange 1b is in close contact with a fuel pump attachment portion 90 of an engine (internal combustion engine) and is fixed by a plurality of bolts (screws) (not illustrated). That is, the high-pressure fuel pump 100 is fixed to the fuel pump attachment portion 90 by the attachment flange 1b.

As illustrated in FIG. 2, an O-ring 93 illustrating a specific example of a seat member is interposed between the fuel pump attachment portion 90 and the pump body 1. The O-ring 93 prevents engine oil from leaking to the outside of the engine (internal combustion engine) through between the fuel pump attachment portion 90 and the pump body 1.

A cylinder 6 that guides the reciprocating motion of the plunger 2 is attached to the pump body 1 of the high-pressure fuel pump 100. The cylinder 6 is formed in a tubular shape, and is press-fitted into the pump body 1 on the outer peripheral side thereof. The pump body 1 and the cylinder 6 form the pressurizing chamber 11 together with the electromagnetic suction valve mechanism 3, the plunger 2, and the discharge valve mechanism 8 (see FIG. 4).

The pump body 1 is provided with a fixing portion 1c that engages with a central portion in the axial direction of the cylinder 6. The fixing portion 1c is formed to be plastically deformable. The fixing portion 1c presses the cylinder 6 upward (upward in FIG. 2). An upper end surface (one end surface) of the cylinder 6 abuts on the pump body 1. As a result, the fuel pressurized in the pressurizing chamber 11 does not leak from between the upper end surface of the cylinder 6 and the pump body 1.

A tappet 92 is provided at the lower end of the plunger 2. The tappet 92 converts rotational motion of the cam 91 attached to a cam shaft of the engine into vertical motion and transmits the vertical motion to the plunger 2. The plunger 2 is biased toward the cam 91 by a spring 16 via a retainer 15, and is crimped to the tappet 92. The plunger 2 reciprocates together with the tappet 92 to change the volume of the pressurizing chamber 11.

A seal holder 17 is disposed between the cylinder 6 and the retainer 15. The seal holder 17 is formed in a tubular shape into which the plunger 2 is inserted. An auxiliary chamber 17a is formed at an upper end portion of the seal holder 17 on the cylinder 6 side. On the other hand, a lower end portion of the seal holder 17 on the retainer 15 side holds a plunger seal 18.

The plunger seal 18 is in slidable contact with the outer periphery of the plunger 2. When the plunger 2 reciprocates, the plunger seal 18 seals the fuel in the auxiliary chamber 17a so that the fuel in the auxiliary chamber 17a does not flow into the engine. The plunger seal 18 prevents lubricating oil (including engine oil) that lubricates a sliding portion in the engine from flowing into the pump body 1.

In FIG. 2, the plunger 2 reciprocates in the vertical direction. When the plunger 2 descends, the volume of the pressurizing chamber 11 increases, and when the plunger 2 rises, the volume of the pressurizing chamber 11 decreases. That is, the plunger 2 is disposed to reciprocate in a direction of enlarging and reducing the volume of the pressurizing chamber 11.

The plunger 2 has a large-diameter portion 2a and a small-diameter portion 2b. When the plunger 2 reciprocates, the large-diameter portion 2a and the small-diameter portion 2b are located in the auxiliary chamber 17a. Therefore, the volume of the auxiliary chamber 17a increases or decreases by the reciprocation of the plunger 2.

The auxiliary chamber 17a communicates with a low-pressure fuel chamber 10 through a fuel passage 10c (see FIG. 3). When the plunger 2 descends, fuel flows from the auxiliary chamber 17a to the low-pressure fuel chamber 10, and when the plunger 2 rises, fuel flows from the low-pressure fuel chamber 10 to the auxiliary chamber 17a. Therefore, the fuel flow rate into and out of the pump in the suction stroke or the return stroke of the high-pressure fuel pump 100 can be reduced, and the pressure pulsation generated in the high-pressure fuel pump 100 can be reduced.

The pump body 1 is provided with the relief valve mechanism 4 communicating with the pressurizing chamber 11. The relief valve mechanism 4 includes a relief spring 41, a relief valve holder 42, a relief valve 43, a seat member 44, and a spring support member 45.

The seat member 44 includes the relief spring 41 and forms a relief valve chamber. One end portion of the relief spring 41 abuts on the spring support member 45, and the other end portion is in contact with the relief valve holder 42. The relief valve holder 42 is engaged with the relief valve 43. The biasing force of the relief spring 41 acts on the relief valve 43 via the relief valve holder 42.

The relief valve 43 is pressed by the biasing force of the relief spring 41 to close the fuel passage of the seat member 44. The fuel passage of the seat member 44 communicates with the discharge passage 1f (see FIG. 3). Movement of fuel between the pressurizing chamber 11 (upstream side) and the seat member 44 (downstream side) is blocked by contact (close contact) of the relief valve 43 with the seat member 44.

When the pressure in the common rail 106 or a member before the common rail increases, the fuel on the seat member 44 side presses the relief valve 43 to move the relief valve 43 against the biasing force of the relief spring 41. As a result, the relief valve 43 is opened, and the fuel in the discharge passage 1f returns to the pressurizing chamber 11 through the fuel passage of the seat member 44. Therefore, the pressure for opening the relief valve 43 is determined by the biasing force of the relief spring 41.

The relief valve mechanism 4 of the present embodiment communicates with the pressurizing chamber 11, but is not limited thereto. For example, the relief valve mechanism 4 may communicate with a low-pressure passage (the low-pressure fuel suction port 51, the suction passage 10b, or the like).

Figure 4:
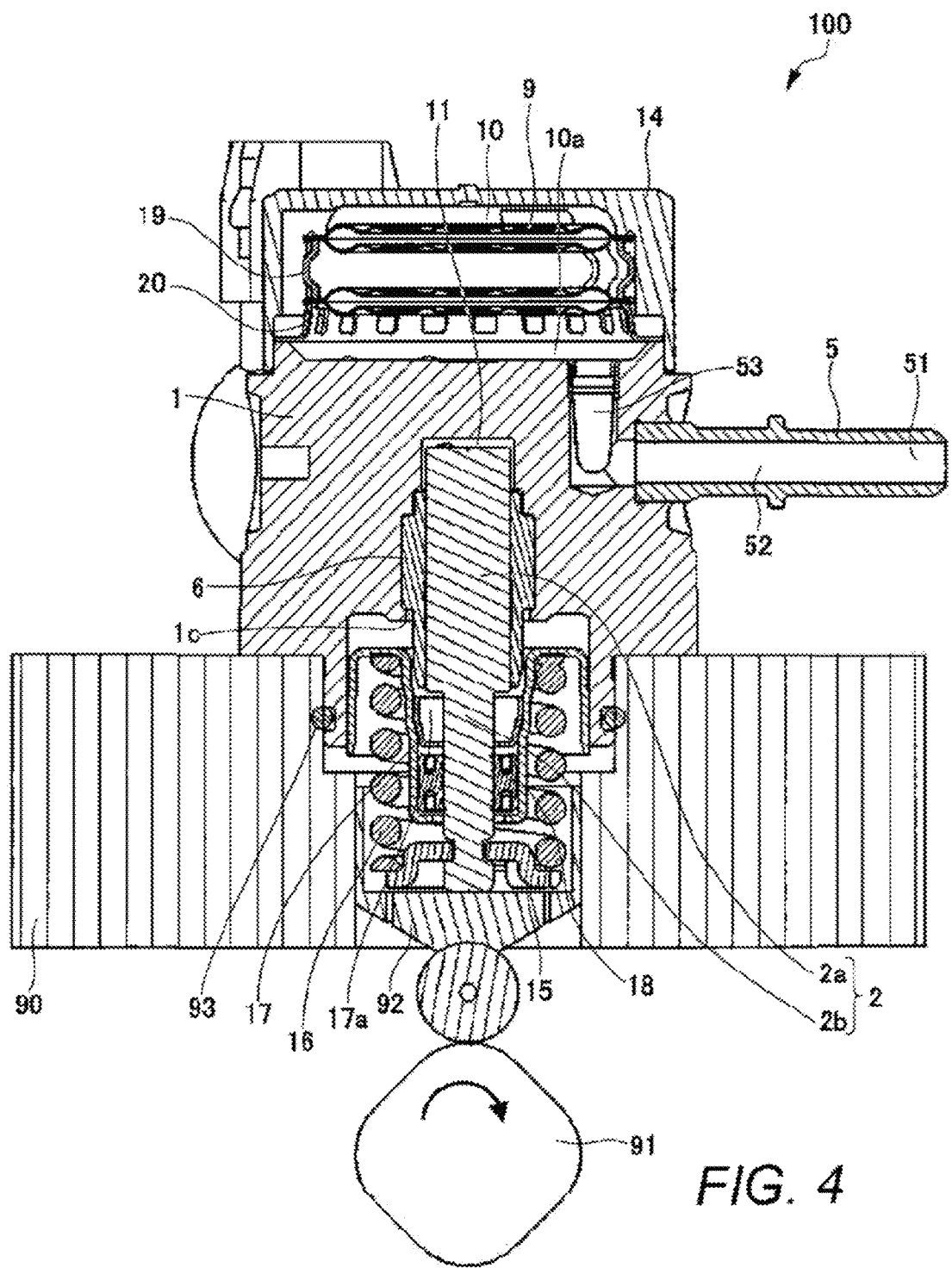
FIG. 4 is a longitudinal cross-sectional view (part 2) of the high-pressure fuel pump according to the embodiment of the present invention.

As illustrated in FIGS. 3 and 4, a suction joint 5 is attached to a side surface of the pump body 1. The suction joint 5 is connected to the low-pressure pipe 104 (see FIG. 1) through which the fuel supplied from the fuel tank 103 passes. The fuel in the fuel tank 103 is supplied from the suction joint 5 to the inside of the high-pressure fuel pump 100.

The suction joint 5 includes a low-pressure fuel suction port 51 connected to the low-pressure pipe 104 and a suction flow path 52 communicating with the low-pressure fuel suction port 51. The fuel that has passed through the suction flow path 52 reaches the suction port 31b (see FIG. 2) of the electromagnetic suction valve mechanism 3 via the metal damper 9 provided in the low-pressure fuel chamber 10 and the suction passage 10b (see FIG. 2). As illustrated in FIG. 4, a suction filter 53 is disposed in the fuel passage communicating with the suction flow path 52. The suction filter 53 removes foreign substances present in the fuel and prevents foreign substances from entering the high-pressure fuel pump 100.

As illustrated in FIGS. 2 and 4, the pump body 1 of the high-pressure fuel pump 100 is provided with a low-pressure fuel chamber (damper chamber) 10. The low-pressure fuel chamber 10 is covered with a damper cover 14. The damper cover 14 is formed in, for example, a tubular shape (cup shape) with one side closed.

As illustrated in FIG. 2, the low-pressure fuel chamber 10 includes a low-pressure fuel flow path 10a and a suction passage 10b. The suction passage 10b communicates with the suction port 31b of the electromagnetic suction valve mechanism 3. The fuel that has passed through the low-pressure fuel flow path 10a reaches the suction port 31b of the electromagnetic suction valve mechanism 3 via the suction passage 10b.

The metal damper 9, and a first holding member 19 and a second holding member 20 for holding the metal damper 9 are provided in the low-pressure fuel flow path 10a. When the fuel flowing into the pressurizing chamber 11 is returned to the suction passage 10b (see FIG. 2) through the electromagnetic suction valve mechanism 3 in the valve open state again, pressure pulsation occurs in the low-pressure fuel chamber 10. The metal damper 9 reduces propagation of pressure pulsation generated in the high-pressure fuel pump 100 to the low-pressure pipe 104.

As illustrated in FIG. 3, the electromagnetic suction valve mechanism 3 is inserted into a lateral hole formed in the pump body 1. The electromagnetic suction valve mechanism 3 includes a suction valve seat 31 press-fitted into the lateral hole formed in the pump body 1, a suction valve 32, a rod 33, a rod biasing spring 34, an electromagnetic coil (solenoid) 35, and an anchor 36.

The suction valve seat 31 is formed in a tubular shape, and a seating portion 31a is provided on an inner peripheral portion. A suction port 31b (see FIG. 2) that reaches the inner peripheral portion from the outer peripheral portion is formed in the suction valve seat 31. The suction port 31b communicates with the suction passage 10b in the low-pressure fuel chamber 10 described above.

A stopper 37 facing the seating portion 31a of the suction valve seat 31 is disposed in the lateral hole formed in the pump body 1. The suction valve 32 is disposed between the stopper 37 and the seating portion 31a. A valve biasing spring 38 is interposed between the stopper 37 and the suction valve 32. The valve biasing spring 38 biases the suction valve 32 toward the seating portion 31a.

The suction valve 32 comes into contact with the seating portion 31a to close the communication portion between the suction port 31b and the pressurizing chamber 11. Therefore, the electromagnetic suction valve mechanism 3 is in a valve closing state. On the other hand, the suction valve 32 comes into contact with the stopper 37 to open the communication portion between the suction port 31b and the pressurizing chamber 11. Therefore, the electromagnetic suction valve mechanism 3 enters a valve open state.

The rod 33 penetrates the suction valve seat 31. One end of the rod 33 is in contact with the suction valve 32. The rod biasing spring 34 biases the suction valve 32 in the valve opening direction which is on the stopper 37 side via the rod 33. One end of the rod biasing spring 34 is engaged with the other end of the rod 33. The other end of the rod biasing spring 34 is engaged with a magnetic core 39 disposed so as to surround the rod biasing spring 34.

The anchor 36 faces the end surface of the magnetic core 39. The anchor 36 is engaged with a flange provided on the outer peripheral portion of the rod 33. One end of an anchor biasing spring 40 is in contact with the side of the anchor 36 opposite to the magnetic core 39. The other end of the anchor biasing spring 40 is in contact with the suction valve seat 31. The anchor biasing spring 40 biases the anchor 36 toward the flange of the rod 33. The movement amount of the anchor 36 is set to be larger than the movement amount of the suction valve 32. Therefore, the suction valve 32 can be reliably brought into contact with (seated on) the seating portion 31a, and the electromagnetic suction valve mechanism 3 can be reliably brought into a valve closing state.

The electromagnetic coil 35 is disposed around the magnetic core 39. A terminal member 30 (see FIG. 2) is electrically connected to the electromagnetic coil 35, and a current flows through the terminal member 30. In a non-energized state in which no current flows through the electromagnetic coil 35, the rod 33 is biased in the valve opening direction by the biasing force of the rod biasing spring 34, and presses the suction valve 32 in the valve opening direction. As a result, the suction valve 32 is separated from the seating portion 31a and abuts on the stopper 37, and the electromagnetic suction valve mechanism 3 is in the valve open state. That is, the electromagnetic suction valve mechanism 3 is a normally open type that opens in a non-energized state.

In the open state of the electromagnetic suction valve mechanism 3, the fuel in the suction port 31b passes between the suction valve 32 and the seating portion 31a, and flows into the pressurizing chamber 11 through a plurality of fuel passing holes (not illustrated) of the stopper 37 and the suction passage 1a. In the valve open state of the electromagnetic suction valve mechanism 3, the suction valve 32 comes into contact with the stopper 37, so that the position of the suction valve 32 in the valve opening direction is restricted. In the valve open state of the electromagnetic suction valve mechanism 3, the gap existing between the suction valve 32 and the seating portion 31a is a movable range of the suction valve 32, which is a valve opening stroke.

When a current flows through the electromagnetic coil 35, a magnetic attraction force acts on the magnetic attraction surfaces of the anchor 36 and the magnetic core 39. That is, the anchor 36 is attracted to the magnetic core 39. As a result, the anchor 36 moves against the biasing force of the rod biasing spring 34 and comes into contact with the magnetic core 39. When the anchor 36 moves in the valve closing direction on the magnetic core 39 side, the rod 33 with which the anchor 36 engages moves together with the anchor 36. As a result, the suction valve 32 is released from the biasing force in the valve opening direction, and moves in the valve closing direction by the biasing force of the valve biasing spring 38. When the suction valve 32 comes into contact with the seating portion 31a of the suction valve seat 31, the electromagnetic suction valve mechanism 3 is closed.

As illustrated in FIG. 3, the discharge valve mechanism 8 is connected to the exit side of the pressurizing chamber 11. The discharge valve mechanism 8 includes a discharge valve seat member 81 and a discharge valve 82 that comes into contact with and separates from the discharge valve seat member 81. The discharge valve mechanism 8 includes a discharge valve spring 83 that biases the discharge valve 82 toward the discharge valve seat member 81, a discharge valve stopper 84 that determines a stroke (movement distance) of the discharge valve 82, and a plug 85 that locks movement of the discharge valve stopper 84.

The discharge valve seat member 81, the discharge valve 82, the discharge valve spring 83, and the discharge valve stopper 84 are housed in a discharge valve chamber 1d formed in the pump body 1. The discharge valve chamber 1d is a substantially columnar space extending in the horizontal direction. One end of the discharge valve chamber 1d communicates with the pressurizing chamber 11 via a fuel passage 1e. The other end of the discharge valve chamber 1d is open to the side surface of the pump body 1. An opening at the other end of the discharge valve chamber 1d is sealed by the plug 85.

A discharge joint 12 is joined to the pump body 1 by a welding portion 12b. The discharge joint 12 has the fuel discharge port 12a. The fuel discharge port 12a communicates with the discharge valve chamber 1d via the discharge passage 1f extending in the horizontal direction inside the pump body 1. The fuel discharge port 12a of the discharge joint 12 is connected to the common rail 106.

In a state where the fuel pressure in the pressurizing chamber 11 is lower than the fuel pressure in the discharge valve chamber 1d, the discharge valve 82 is crimped to the discharge valve seat member 81 by the differential pressure acting on the discharge valve 82 and the biasing force of the discharge valve spring 83. As a result, the discharge valve mechanism 8 is closed. On the other hand, when the fuel pressure in the pressurizing chamber 11 becomes larger than the fuel pressure in the discharge valve chamber 1d and the differential pressure acting on the discharge valve 82 becomes larger than the biasing force of the discharge valve spring 83, the discharge valve 82 is pushed by the fuel and separated from the discharge valve seat member 81. As a result, the discharge valve mechanism 8 is opened.

When the discharge valve mechanism 8 performs an on-off valve operation, fuel is taken into and out of the discharge valve chamber 1d. Then, the fuel discharged from the discharge valve chamber 1d is discharged from the discharge valve mechanism 8 to the discharge passage 1f. As a result, the high-pressure fuel in the pressurizing chamber 11 is discharged to the common rail 106 (see FIG. 1) via the discharge valve chamber 1d, the discharge passage 1f, and the fuel discharge port 12a of the discharge joint 12. With the above configuration, the discharge valve mechanism 8 functions as a check valve that restricts the direction of fuel flow.

[Operation of Fuel Pump]

Next, the operation of the high-pressure fuel pump 100 according to the present embodiment will be described.

When the plunger 2 illustrated in FIG. 1 descends and the electromagnetic suction valve mechanism 3 is opened, the fuel flows from the suction passage 1a into the pressurizing chamber 11. Hereinafter, a stroke in which the plunger 2 descends is referred to as a suction stroke. On the other hand, when the plunger 2 rises and the electromagnetic suction valve mechanism 3 is closed, the fuel in the pressurizing chamber 11 is pressurized, passes through the discharge valve mechanism 8, and is pressure-fed to the common rail 106 (see FIG. 1). Hereinafter, the process of raising the plunger 2 is referred to as a compression stroke.

As described above, when the electromagnetic suction valve mechanism 3 is closed during the compression stroke, the fuel sucked into the pressurizing chamber 11 during the suction stroke is pressurized and discharged toward the common rail 106. On the other hand, when the electromagnetic suction valve mechanism 3 is opened during the compression stroke, the fuel in the pressurizing chamber 11 is pushed back toward the suction passage 1a and is not discharged toward the common rail 106. In this manner, the fuel discharge by the high-pressure fuel pump 100 is operated by opening and closing the electromagnetic suction valve mechanism 3. The opening and closing of the electromagnetic suction valve mechanism 3 is controlled by the ECU 101.

In the suction stroke, the volume of the pressurizing chamber 11 increases, and the fuel pressure in the pressurizing chamber 11 decreases. In this suction stroke, when the fuel pressure in the pressurizing chamber 11 becomes lower than the pressure in the suction port 31*b* (see FIG. 2) and the biasing force due to the differential pressure therebetween exceeds the biasing force by the valve biasing spring 38, the suction valve 32 is separated from the seating portion 31*a*, and the electromagnetic suction valve mechanism 3 is opened. As a result, the fuel passes between the suction valve 32 and the seating portion 31*a*, passes through a plurality of holes provided in the stopper 37, and flows into the pressurizing chamber 11.

The high-pressure fuel pump 100 moves to the compression stroke after finishing the suction stroke. At this time, the electromagnetic coil 35 remains in a non-energized state, and no magnetic attraction force acts between the anchor 36 and the magnetic core 39. The rod biasing spring 34 is set to have a biasing force necessary and sufficient to maintain the suction valve 32 at the valve opening position away from the seating portion 31*a* in the non-energized state.

In this state, even when the plunger 2 moves upward, the rod 33 remains at the valve opening position, so that the suction valve 32 biased by the rod 33 also remains at the valve opening position. Therefore, the volume of the pressurizing chamber 11 decreases with the upward movement of the plunger 2, but in this state, the fuel once sucked into the pressurizing chamber 11 is returned to the suction passage 10*b* through the electromagnetic suction valve mechanism 3 in the valve open state again, and the pressure inside the pressurizing chamber 11 does not increase. This stroke is called a return stroke.

In the return process, when a control signal from the ECU 101 (see FIG. 1) is applied to the electromagnetic suction valve mechanism 3, a current flows through the electromagnetic coil 35 via the terminal member 30. When the current flows through the electromagnetic coil 35, a magnetic attraction force acts on the magnetic attraction surfaces of the magnetic core 39 and the anchor 36, and the anchor 36 is attracted to the magnetic core 39. When the magnetic attraction force becomes larger than the biasing force of the rod biasing spring 34, the anchor 36 moves toward the magnetic core 39 against the biasing force of the rod biasing spring 34, and the rod 33 engaged with the anchor 36 moves in a direction away from the suction valve 32. As a result, the suction valve 32 is seated on the seating portion 31*a* by the biasing force of the valve biasing spring 38 and the fluid force caused by the fuel flowing into the suction passage 10*b*, and the electromagnetic suction valve mechanism 3 is closed.

After the electromagnetic suction valve mechanism 3 is closed, the fuel in the pressurizing chamber 11 is pressurized as the plunger 2 rises, and when the pressure becomes equal to or higher than the pressure of the fuel discharge port 12*a*, the fuel passes through the discharge valve mechanism 8 and is discharged to the common rail 106 (see FIG. 1). This stroke is called a discharge stroke. That is, the compression stroke between the bottom dead center and the top dead center of the plunger 2 includes the return stroke and the discharge stroke. Then, the amount of the discharging high-pressure fuel can be controlled by controlling timing for energizing the electromagnetic coil 35 of the electromagnetic suction valve mechanism 3.

If the timing for energizing the electromagnetic coil 35 is set to be advanced, the ratio of the return stroke in the compression stroke becomes small, and the ratio of the discharge stroke becomes large. As a result, the amount of fuel returned to the suction passage 10*b* decreases, and the amount of fuel discharged at high pressure increases. On the other hand, if the timing of energizing the electromagnetic coil 35 is delayed, the ratio of the return stroke during the compression stroke increases, and the ratio of the discharge stroke decreases. As a result, the amount of fuel returned to the suction passage 10*b* increases, and the amount of fuel discharged at a high pressure decreases. As described above, by controlling the timing of energizing the electromagnetic coil 35, the amount of fuel discharged at high pressure can be controlled to an amount required by the engine (internal combustion engine).

[Cylinder]

Next, the cylinder 6 will be described with reference to FIGS. 5 to 8.

Figure 5:
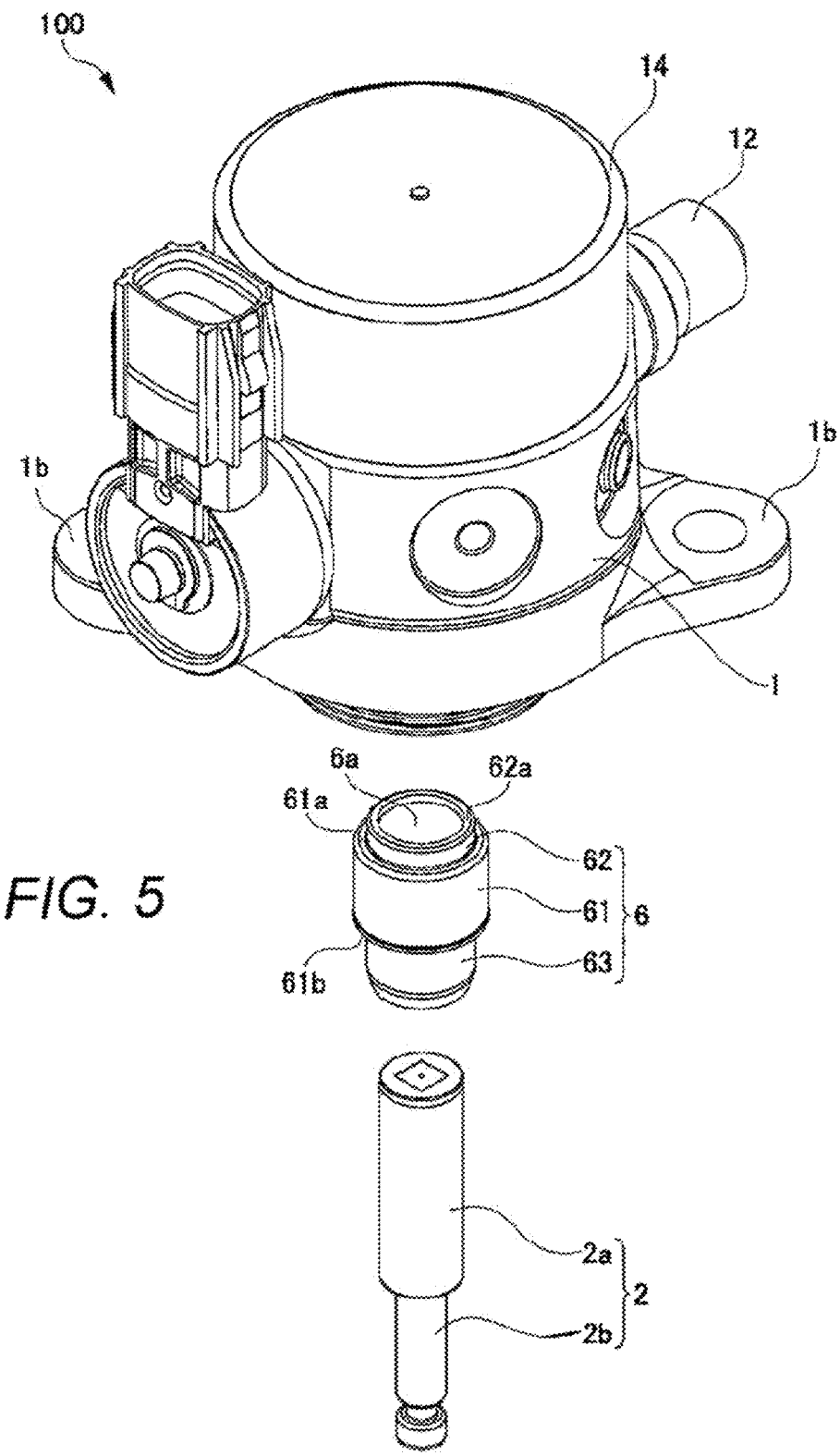
FIG. 5 is an exploded perspective view of the high-pressure fuel pump according to the embodiment of the present invention.
Figure 6:
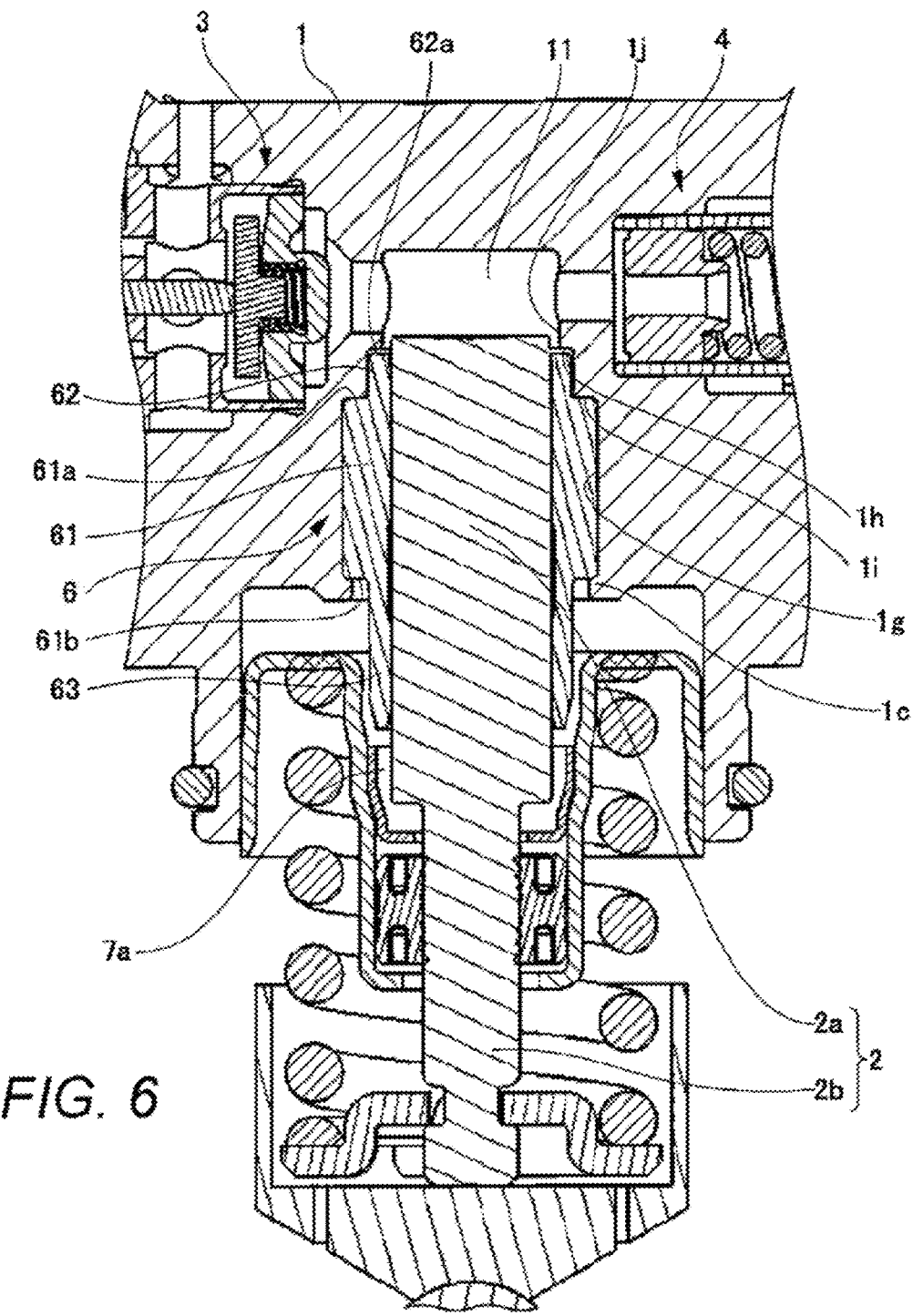
FIG. 6 is a longitudinal cross-sectional view of the vicinity of a cylinder of the high-pressure fuel pump according to the embodiment of the present invention.
Figure 7:
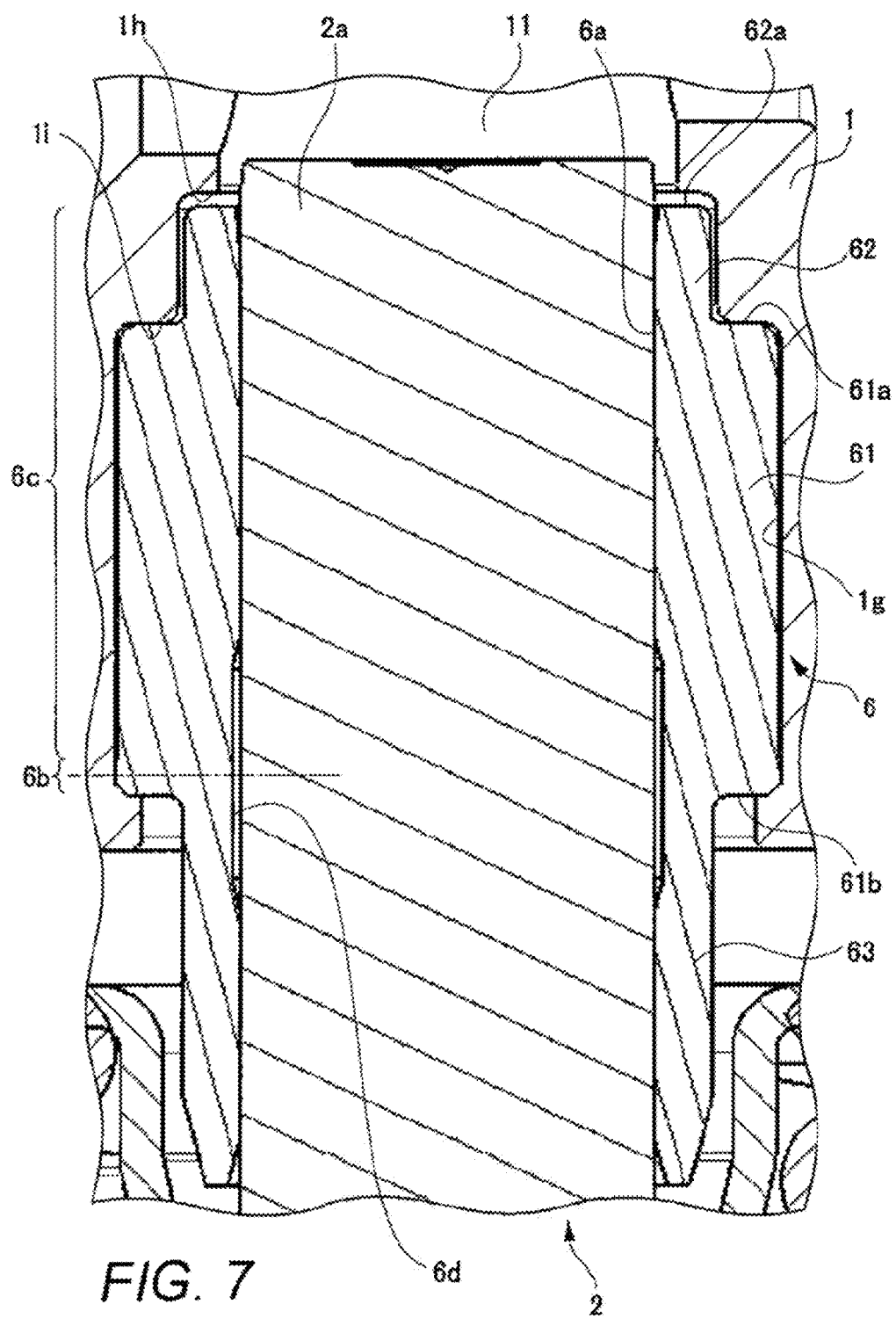
FIG. 7 is an enlarged longitudinal cross-sectional view of the cylinder of the high-pressure fuel pump according to the embodiment of the present invention.
Figure 8:
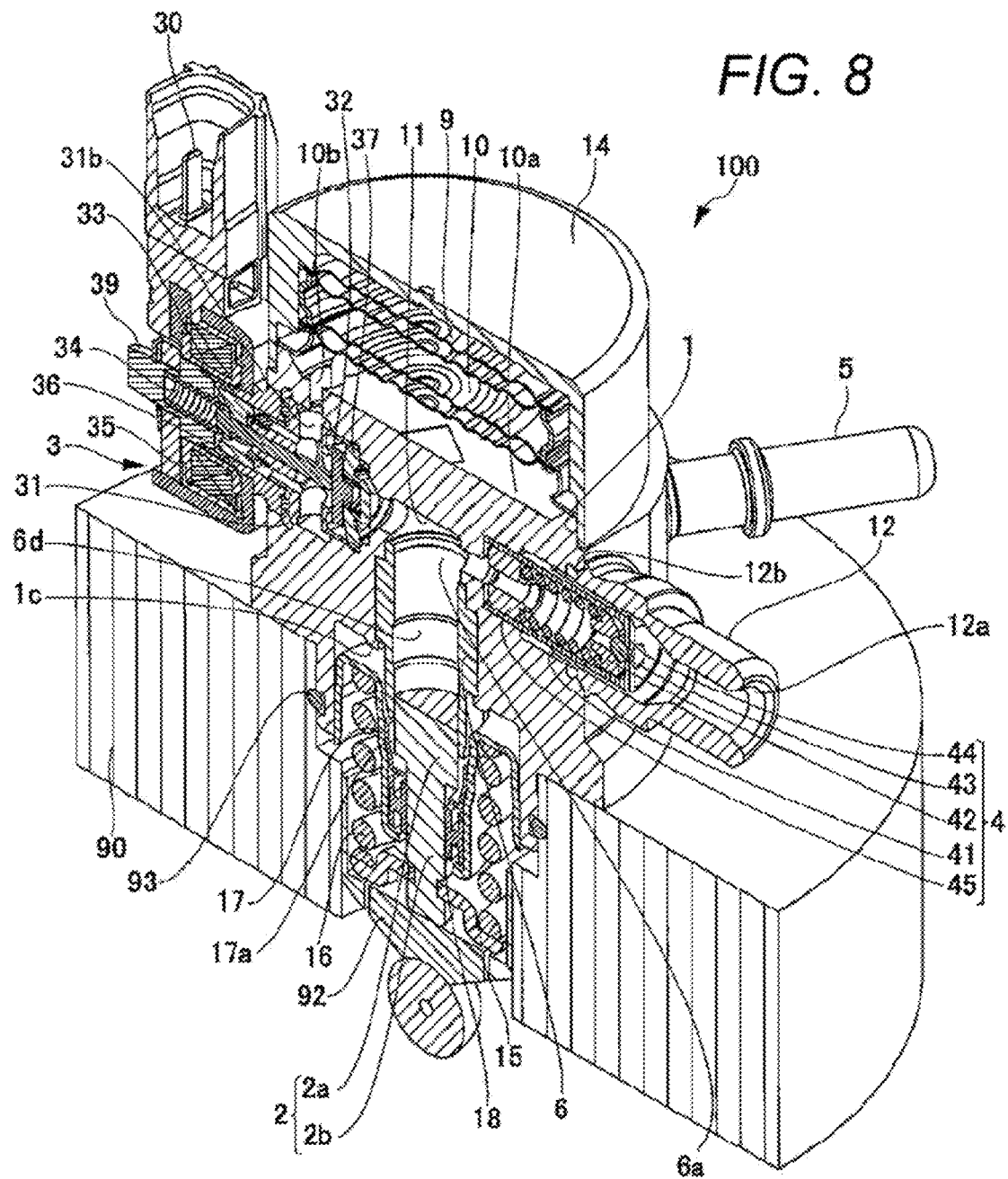
FIG. 8 is a cross-sectional view of the cylinder of the high-pressure fuel pump according to the embodiment of the present invention as viewed obliquely from above.

FIG. 5 is an exploded perspective view of the high-pressure fuel pump 100. FIG. 6 is a longitudinal cross-sectional view of the vicinity of the cylinder of the high-pressure fuel pump 100. FIG. 7 is an enlarged longitudinal cross-sectional view of the cylinder of the high-pressure fuel pump 100. FIG. 8 is a cross-sectional view of the cylinder of the high-pressure fuel pump 100 as viewed obliquely from above.

As illustrated in FIG. 5, the cylinder 6 is formed in a cylindrical shape having a guide hole 6*a* extending in the axial direction. The cylinder 6 includes a large-diameter portion 61, a first small-diameter portion 62, and a second small-diameter portion 63. The large-diameter portion 61 forms an intermediate portion of the cylinder 6. The first small-diameter portion 62 forms an upper end portion of the cylinder 6, and the second small-diameter portion 63 forms a lower end portion of the cylinder 6.

The large-diameter portion 61 has an end surface 61*a* which is one end (upper end) in the axial direction and an end surface 61*b* which is the other end (lower end) in the axial direction. The first small-diameter portion 62 is continuous with the end surface 61*a* of the large-diameter portion 61. The first small-diameter portion 62 has an end surface 62*a* at one end opposite to the large-diameter portion 61. The first small-diameter portion 62 is inserted into the pump body 1 together with the large-diameter portion 61. The second small-diameter portion 63 is continuous with the end surface 61*b* of the large-diameter portion 61. The second small-diameter portion 63 is disposed outside the pump body 1.

As illustrated in FIG. 6, a cylinder insertion hole 1*g* into which the cylinder 6 is inserted is formed in the pump body 1. The cylinder insertion hole 1*g* is formed in a substantially columnar shape. The end portion of the cylinder insertion hole 1*g* on the pressurizing chamber 11 side is formed in a stepped shape. Therefore, a bottom surface portion 1*h* of the cylinder insertion hole 1*g* and a contact portion 1*i* are provided inside the pump body 1.

A pressurizing chamber forming hole 1*j* forming the pressurizing chamber 11 is provided in a central portion of the bottom surface portion 1*h*. The pressurizing chamber forming hole 1*j* is formed in a circular shape. The center of the pressurizing chamber forming hole 1*j* coincides with the axial center of the cylinder insertion hole 1*g*. The outer diameter of the bottom surface portion 1*h* is smaller than the outer diameter of the contact portion 1*i*.

The end surface 62*a* of the first small-diameter portion 62 of the cylinder 6 faces the bottom surface portion 1*h* of the cylinder insertion hole 1g with a predetermined gap. In a state where the plunger 2 is at the bottom dead center, the tip portion of the plunger 2 (the end surface of the large-diameter portion 2a) protrudes toward the pressurizing chamber 11 from the end surface 62a of the cylinder 6.

The end surface 61a of the large-diameter portion 61 is in contact with the contact portion 1i'. The end surface 61b of the large-diameter portion 61 is in contact with the fixing portion 1c of the pump body 1 described above. The end surface 61b corresponds to the engaging portion according to the present invention. The fixing portion 1c is plastically deformed by being caulked. The fixing portion 1c presses the end surface 61b of the large-diameter portion 61.

Next, a press-fitting portion between the cylinder 6 and the pump body 1 and the clearance between the cylinder 6 and the pump body 1 will be described. As illustrated in FIG. 7, the large-diameter portion 61 of the cylinder 6 has a press-fitting portion 6b. The press-fitting portion 6b is provided on the outer peripheral portion of the large-diameter portion 61 on the second small-diameter portion 63 side. That is, the press-fitting portion 6b is located on the side (lower side) opposite to the pressurizing chamber 11 with respect to the intermediate portion in the axial direction of the cylinder 6.

The press-fitting portion 6b is formed in an annular shape continuous in the circumferential direction on the outer peripheral surface of the large-diameter portion 61 (cylinder 6). The press-fitting portion 6b of the large-diameter portion 61 is in contact with the inner wall surface of the cylinder insertion hole 1g. That is, the press-fitting portion 6b of the large-diameter portion 61 is press-fitted into the cylinder insertion hole 1g. Therefore, the cylinder 6 can be easily fixed to the pump body 1. The axial center of the cylinder 6 and the axial center of the cylinder insertion hole 1g can be easily aligned.

The plunger 2 is movably held by the pump body 1. Therefore, the axial center of the cylinder 6 and the axial center of the plunger 2 can be easily aligned by aligning the axial center of the cylinder 6 and the axial center of the cylinder insertion hole 1g. The cylinder 6 may be fixed to the pump body 1 by screw joining without providing the press-fitting portion 6b.

In the cylinder 6, a clearance portion 6c that generates a gap with the pump body 1 is provided on the pressurizing chamber 11 side with respect to the press-fitting portion 6b. The clearance portion 6c is provided on the outer peripheral surface of the large-diameter portion 61 closer to the pressurizing chamber 11 than the press-fitting portion 6b and on the outer peripheral surface of the first small-diameter portion 62. The clearance portion 6c is formed in an annular shape continuous in the circumferential direction on the outer peripheral surfaces of the large-diameter portion 61 and the first small-diameter portion 62.

Further, a groove 6d that generates a gap with the plunger 2 is provided on the inner peripheral surface of the cylinder 6. As illustrated in FIG. 7, the groove 6d is disposed at a position corresponding to the press-fitting portion 6b. That is, the groove 6d is disposed at a position overlapping the press-fitting portion 6b when viewed from the radial direction of the cylinder 6.

As illustrated in FIGS. 7 and 8, the groove 6d is formed in an annular shape continuous in the circumferential direction on the inner peripheral surface of the cylinder 6. The length of the groove 6d in the axial direction of the cylinder 6 is longer than the length of the press-fitting portion 6b in the axial direction of the cylinder 6. In the present embodiment, the length of the groove 6d in the axial direction of the cylinder 6 is about three times the length of the press-fitting portion 6b in the axial direction of the cylinder 6.

In the axial direction of the cylinder 6, the central portion of the groove 6d coincides with the central portion of the press-fitting portion 6b. The groove 6d is located at the intermediate portion in the axial direction of the cylinder 6. In the state where the plunger 2 is at the bottom dead center, the tip portion of the plunger 2 (the end surface of the large-diameter portion 2a) protrudes toward the pressurizing chamber 11 from the end surface 62a of the cylinder 6.

The fuel is increased to a high pressure in the pressurizing chamber 11, and the temperature of the fuel increases accordingly. When the temperature of the fuel rises, the cylinder 6 thermally expands. In particular, in recent years, since it has been required to discharge high-pressure fuel, an increase in the temperature of the fuel has become large. At this time, when the upper portion (hereinafter, the upper outer peripheral surface) of the outer peripheral surface of the cylinder 6 is in contact with the inner peripheral surface of the cylinder insertion hole 1g, the upper outer peripheral surface of the cylinder 6 is pressed against the pump body 1 when the upper portion of the cylinder 6 is deformed due to thermal expansion. An upper portion (hereinafter, it is referred to as an "upper inner peripheral surface") of the inner peripheral surface of the cylinder 6 is pressed against the plunger 2. As a result, a so-called fixing phenomenon occurs in which the plunger 2 does not slide.

In the present embodiment, since the clearance portion 6c is provided in the cylinder 6, even if the upper portion of the cylinder 6 is deformed due to thermal expansion, the deformation can be absorbed by the clearance portion 6c. As a result, the upper outer peripheral surface of the cylinder 6 can be suppressed from being pressed against the inner peripheral surface of the cylinder insertion hole 1g. The length (distance) of the gap between the cylinder 6 and the pump body 1 generated by the clearance portion 6c is determined according to the thermal expansion coefficient of the cylinder 6, the temperature of the fuel in the pressurizing chamber 11, and the like.

Since the upper portion of the cylinder 6 is deformed outward in the radial direction with a gap (space), it is possible to suppress the deformation of the upper inner peripheral surface of the cylinder 6 inward in the radial direction. This prevents the upper inner peripheral surface of the cylinder 6 from being pressed against the outer peripheral surface of the plunger 2. As a result, the sticking phenomenon of the plunger 2 can be avoided.

When the gap between the cylinder 6 and the plunger 2 is increased in consideration of deformation of the upper portion of the cylinder 6 due to thermal expansion, the amount of fuel entering between the cylinder 6 and the plunger 2 increases. As a result, the discharge flow rate of the fuel pump decreases. However, in the present embodiment, since the upper portion of the cylinder 6 is deformed outward in the radial direction, the gap between the cylinder 6 and the plunger 2 can be reduced. As a result, it is possible to increase the flow rate of the high-pressure fuel pump 100.

On the other hand, the press-fitting portion 6b of the cylinder 6 is in contact with the pump body 1. Therefore, when the cylinder 6 is thermally expanded, the press-fitting portion 6b of the cylinder 6 is pressed against the pump body 1. Therefore, when the cylinder 6 thermally expands, deformation in the press-fitting portion 6b cannot be absorbed on the outer side in the radial direction of the cylinder. Therefore, it is not possible to suppress the portion (hereinafter, it is referred to as a "press-fitting inner peripheral surface".) corresponding to the press-fitting portion 6b on the inner peripheral surface of the cylinder 6 from being deformed inward in the radial direction. The press-fitting inner peripheral surface includes a region overlapping at least the press-fitting portion 6b in the radial direction of the cylinder 6.

In the present embodiment, since the groove 6d is provided in the cylinder 6, even if the press-fitting inner peripheral surface of the cylinder 6 is deformed inward in the radial direction, the deformation can be absorbed by the groove 6d. This prevents the press-fitting inner peripheral surface of the cylinder 6 from being pressed against the outer peripheral surface of the plunger 2. As a result, the sticking phenomenon of the plunger 2 can be avoided.

The region that thermally expands on the inner peripheral surface of the cylinder 6 varies depending on the length of the press-fitting portion 6b in the axial direction of the cylinder 6, the plate thickness of the cylinder 6 at the portion where the press-fitting portion 6b is provided, the material of the cylinder 6, and the like. Therefore, the length of the groove 6d in the axial direction of the cylinder 6 is preferably appropriately set according to the length of the press-fitting portion 6b in the axial direction of the cylinder 6, the plate thickness of the cylinder 6 at the portion where the press-fitting portion 6b is provided, the material of the cylinder 6, and the like.

The press-fitting portion 6b is located on the side opposite to the pressurizing chamber 11 with respect to the intermediate portion in the axial direction of the cylinder 6. In other words, the press-fitting portion 6b is located on the opening side of the cylinder insertion hole 1g into which the cylinder 6 is inserted. Therefore, the press-fitting portion 6b can be moved away from the pressurizing chamber 11, and the temperature of the fuel in the pressurizing chamber 11 can be made difficult to be transmitted to the press-fitting portion 6b. As a result, the amount of deformation due to thermal expansion of the press-fitting inner peripheral surface of the cylinder 6 can be suppressed.

In the present embodiment, the first small-diameter portion 62 is provided closer to the pressurizing chamber 11 than the large-diameter portion 61 in the cylinder 6. Therefore, the sliding distance of the plunger 2 can be secured, and the fuel in the pressurizing chamber 11 can be prevented from flowing to the lower portion side of the plunger 2. Since the first small-diameter portion 62 is smaller than the large-diameter portion 61, a space for disposing the cylinder 6 can be reduced. As a result, the cylinder 6 can be prevented from interfering with other members (for example, the electromagnetic suction valve mechanism 3 and the discharge valve mechanism 8), and the strength of the pump body 1 can be secured.

2. Summary

As described above, the high-pressure fuel pump 100 (fuel pump) according to the above-described embodiment includes the plunger 2 (plunger) that reciprocates, the cylinder 6 (cylinder) in which the guide hole 6a (guide hole) that guides the reciprocating motion of the plunger 2 extends in the axial direction, and the pump body 1 (pump body) that holds the cylinder 6. The pump body 1 includes the cylinder insertion hole 1g (cylinder insertion hole) into which the cylinder 6 is inserted, and the pressurizing chamber 11 that communicates with the cylinder insertion hole 1g and whose volume increases or decreases by the reciprocating motion of the plunger 2. The cylinder 6 includes a press-fitting portion 6b (press-fitting portion) press-fitted into the inner peripheral surface of the cylinder insertion hole 1g, and a groove 6d (groove) formed at a position corresponding to the press-fitting portion 6b on the inner peripheral surface of the guide hole 6a.

Therefore, even if the press-fitting inner peripheral surface of the cylinder 6 is deformed inward in the radial direction, the deformation can be absorbed by the groove 6d. The press-fitting inner peripheral surface of the cylinder 6 can be prevented from being pressed against the outer peripheral surface of the plunger 2. As a result, the sticking phenomenon of the plunger 2 can be avoided.

In the high-pressure fuel pump 100 (fuel pump) according to the above-described embodiment, the length of the groove 6d (groove) in the axial direction of the cylinder 6 (cylinder) is longer than the length of the press-fitting portion 6b (press-fitting portion) in the axial direction of the cylinder 6. Therefore, even if the region where the press-fitting inner peripheral surface of the cylinder 6 is deformed inward in the radial direction is longer than the length of the press-fitting portion 6b in the axial direction of the cylinder 6, the deformation can be absorbed by the groove 6d.

In the high-pressure fuel pump 100 (fuel pump) according to the above-described embodiment, the central portion of the groove 6d (groove) coincides with the central portion of the press-fitting portion 6b (press-fitting portion) in the axial direction of the cylinder 6 (cylinder). Therefore, the groove 6d can be provided in the portion expanded by the heat transferred from the press-fitting portion 6b of the cylinder 6. As a result, even if the press-fitting inner peripheral surface of the cylinder 6 is deformed inward in the radial direction, the deformation can be absorbed by the groove 6d.

The press-fitting portion 6b (press-fitting portion) in the high-pressure fuel pump 100 (fuel pump) according to the above-described embodiment is provided below the intermediate portion in the axial direction of the cylinder 6 (cylinder) (on the side opposite to the pressurizing chamber 11). Therefore, the press-fitting portion 6b can be moved away from the pressurizing chamber 11, and the temperature of the fuel in the pressurizing chamber 11 can be made difficult to be transmitted to the press-fitting portion 6b. As a result, the amount of deformation due to thermal expansion of the press-fitting inner peripheral surface in the cylinder 6 can be suppressed.

The press-fitting portion 6b (press-fitting portion) of the high-pressure fuel pump 100 (fuel pump) according to the above-described embodiment is press-fitted into the inner peripheral surface on the opening side (side opposite to the pressurizing chamber 11) of the cylinder insertion hole 1g (cylinder insertion hole). Therefore, the press-fitting portion 6b can be moved away from the pressurizing chamber 11, and the temperature of the fuel in the pressurizing chamber 11 can be made difficult to be transmitted to the press-fitting portion 6b. As a result, the amount of deformation due to thermal expansion of the press-fitting inner peripheral surface in the cylinder 6 can be suppressed.

The cylinder 6 (cylinder) in the high-pressure fuel pump 100 (fuel pump) according to the above-described embodiment includes the large-diameter portion 61 (large-diameter portion) having the end surface 61a (end surface) in contact with the contact portion 1i (contact portion) provided inside the pump body 1 (pump body), and the first small-diameter portion 62 (small-diameter portion) continuously extending to the pressurizing chamber 11 (pressurizing chamber) side from the end surface of the large-diameter portion 61. Therefore, the sliding distance of the plunger 2 (plunger) can be secured, and the fuel in the pressurizing chamber 11 can be prevented from flowing to the lower portion side of the plunger 2. The cylinder 6 can be prevented from interfering with other members, and the strength of the pump body 1 can be secured.

The press-fitting portion 6b (press-fitting portion) in the high-pressure fuel pump 100 (fuel pump) according to the above-described embodiment is formed on the outer peripheral surface of the large-diameter portion 61 (large-diameter portion). Therefore, the press-fitting portion 6b can be provided at a position away from the pressurizing chamber 11 (pressurizing chamber). As a result, the temperature of the fuel in the pressurizing chamber 11 is less likely to be transmitted to the press-fitting portion 6b, and the amount of deformation due to thermal expansion of the press-fitting inner peripheral surface in the cylinder 6 can be suppressed.

The cylinder 6 (cylinder) in the high-pressure fuel pump 100 (fuel pump) according to the above-described embodiment has the end surface 61b (engaging portion) provided on the side opposite to the pressurizing chamber 11 (pressurizing chamber) with respect to the press-fitting portion 6b (press-fitting portion). The pump body 1 (pump body) has the fixing portion 1c (fixing portion) protruding from the inner peripheral surface of the cylinder insertion hole 1g (cylinder insertion hole). The fixing portion 1c presses the end surface 61b of the cylinder 6 toward the pressurizing chamber. Therefore, the cylinder 6 can be reliably fixed to the pump body 1.

The fixing portion 1c (fixing portion) in the high-pressure fuel pump 100 (fuel pump) according to the above-described embodiment is plastically deformed to press the end surface 61b (engaging portion) of the cylinder 6 (cylinder). Therefore, the cylinder 6 can be firmly fixed to the pump body 1. As a result, the pressure of the fuel in the pressurizing chamber 11 can be increased.

The embodiments of the fuel pump of the present invention have been described above including the operational effects thereof. However, the fuel pump of the present invention is not limited to the above-described embodiment, and various modifications can be made without departing from the gist of the invention described in the claims. The above embodiments are described in detail for easy understanding the present invention, but not necessarily limited to those including all the configurations described.

For example, in the high-pressure fuel pump 100 according to the above-described embodiment, the length of the groove 6d in the axial direction of the cylinder 6 is longer than the length of the press-fitting portion 6b in the axial direction of the cylinder 6. However, in the fuel pump according to the present invention, it is sufficient that a groove is provided in a portion that is deformed inward in the radial direction on the inner peripheral surface of the cylinder. Therefore, if the portion that deforms inward in the radial direction on the inner peripheral surface of the cylinder is equal to or less than the length of the press-fitting portion in the axial direction of the cylinder 6, the length of the groove may be set to be equal to or less than the length of the press-fitting portion.

REFERENCE SIGNS LIST 1 pump body
1a suction passage
1b flange
1c fixing portion
1d discharge valve
1e fuel passage
1f discharge passage
1g cylinder insertion hole
1h bottom surface portion
1i contact portion
1j pressurizing chamber forming hole
2 plunger
3 electromagnetic suction valve mechanism
4 relief valve mechanism
5 suction joint
6 cylinder
6a guide hole
6b press-fitting portion
6c clearance portion
6d groove
8 discharge valve mechanism
9 metal damper
10 low-pressure fuel chamber
11 pressurizing chamber
12 discharge joint
51 low-pressure fuel suction port
61 large-diameter portion
61a, 61b end surface
62 first small-diameter portion
62a end surface
63 second small-diameter portion
100 high-pressure fuel pump
101 ECU
102 feed pump
103 fuel tank
104 low-pressure pipe
105 fuel pressure sensor
106 common rail
107 injector
200 fuel supply system

The invention claimed is:

1. A fuel pump comprising:
a plunger that reciprocates;
a cylinder in which a guide hole for guiding a reciprocating motion of the plunger extends in an axial direction; and
a pump body that includes a cylinder insertion hole into which the cylinder is inserted, and a pressurizing chamber that communicates with the cylinder insertion hole and has a volume increased or decreased by the reciprocating motion of the plunger, and holds the cylinder, wherein
the cylinder includes a press-fitting portion in contact with an inner peripheral surface of the cylinder insertion hole, and a groove formed at a position corresponding to the press-fitting portion on an inner peripheral surface of the guide hole,
the press-fitting portion is formed in an annular shape continuous in a circumferential direction on the outer peripheral surface of the cylinder,
the groove is disposed at a position overlapping the press-fitting portion when viewed from the radial direction of the cylinder, and is formed in an annular shape continuous in the circumferential direction on the inner peripheral surface of the cylinder,
a length of the groove in an axial direction of the cylinder is longer than a length of the press-fitting portion in the axial direction of the cylinder,
a central portion of the groove coincides with a central portion of the press-fitting portion in the axial direction of the cylinder, and
the plunger slides on the inner peripheral surface of the guide hole where the groove is not formed.

2. The fuel pump according to claim 1, wherein
the press-fitting portion is provided below an intermediate portion in the axial direction of the cylinder.

3. The fuel pump according to claim 1, wherein
the press-fitting portion is press-fitted into an inner peripheral surface on an opening side of the cylinder insertion hole.

4. The fuel pump according to claim 1, wherein
the cylinder includes a large-diameter portion having an end surface in contact with a contact portion provided inside the pump body, and a small-diameter portion continuously extending to the pressurizing chamber side from the end surface of the large-diameter portion.

5. The fuel pump according to claim 4, wherein
the press-fitting portion is formed on an outer peripheral surface of the large-diameter portion.

6. The fuel pump according to claim 1, wherein
the cylinder includes an engaging portion provided on a side opposite to the pressurizing chamber with respect to the press-fitting portion,
the pump body includes a fixing portion protruding from an inner peripheral surface of the cylinder insertion hole, and
the fixing portion presses the engaging portion of the cylinder toward the pressurizing chamber.

7. The fuel pump according to claim 6, wherein
the fixing portion is plastically deformed to press the engaging portion of the cylinder.

* * * * *